March 9, 1926.
J. G. SWAIN
1,576,073
WHEEL CONSTRUCTION
Filed April 6, 1922
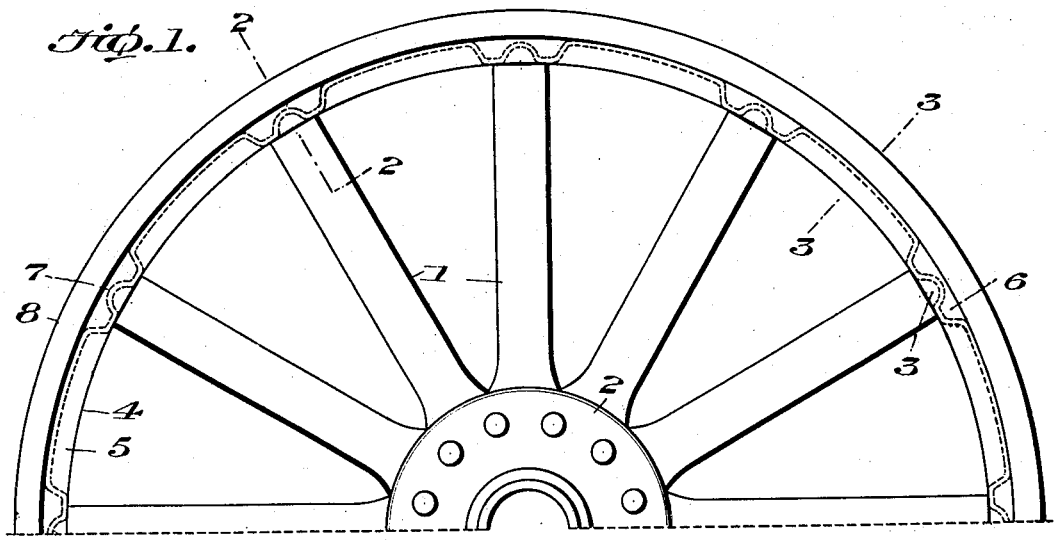
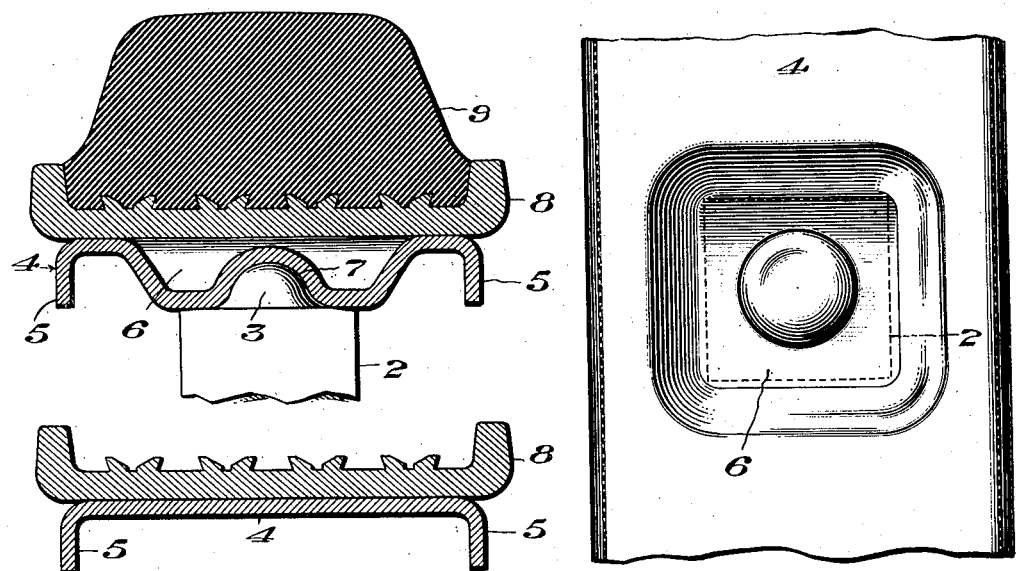
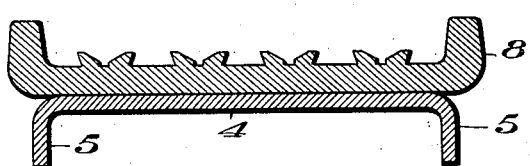
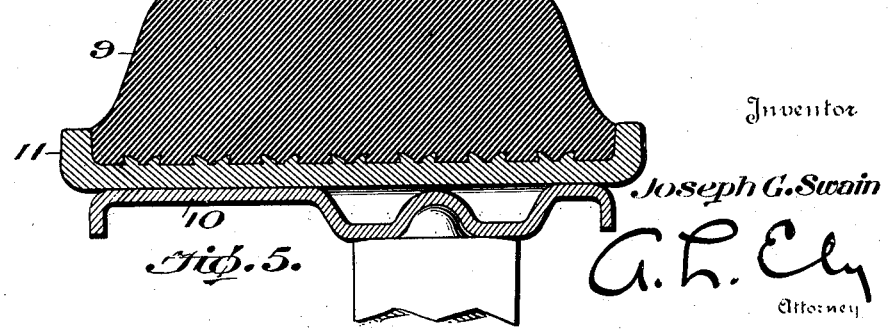
Inventor
Joseph G. Swain
Attorney Patented Mar. 9, 1926.

1,576,073

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL CONSTRUCTION.

Application filed April 6, 1922. Serial No. 550,006.

*To all whom it may concern:*

Be it known that I, JOSEPH G. SWAIN, a citizen of the United States, residing at Akron, county of Summit, and State of Ohio, have invented certain new and useful Improvements in Wheel Constructions, of which the following is a specification.

This invention relates to the construction of vehicle wheels, particularly those designed for use on heavy motor vehicles, such as trucks or the like. It relates particularly to that type of wheel in which the felloe or periphery of the wheel is formed by an endless metal band on which is mounted the resilient tire carrying rim, the wooden spokes of the wheel being seated in the metal rim.

The objects of the invention are to strengthen a wheel of this type and adapt it for heavy truck work, and to form a wheel structure adapted to receive and hold a tire carrying rim by the operation known in the art as "pressing on".

These and other objects will be apparent from the description of the invention, it being understood that changes and modifications may be made without departing from the essential features of the invention or sacrificing any of its benefits.

In the drawings in which certain forms of the invention are shown:

Fig. 1 is a side elevation of a portion of the wheel structure.

Fig. 2 is a cross section of the wheel at a spoke end on the line 2—2 of Fig. 1.

Fig. 3 is a cross section of the wheel between the spoke ends on the line 3—3 of Fig. 1.

Fig. 4 is a view looking down on the end of a spoke.

Fig. 5 is a cross section similar to Fig. 2 of a modified form of wheel construction.

In the drawings 1 represents the spokes which are assembled in the usual manner common to that type of wheel known as the artillery type wherein the mitered ends of the spokes are assembled to form the hub 2. The main portion of length of the spoke may be formed generally square in cross section, as shown in Fig. 4, this type of spoke being particularly suited for the construction of heavy wheels such as used on trucks or heavy vehicles.

The outer end of the spoke is sawed off square except for a centrally located knob or convex formation 3 which is provided so as to seat the spoke in the manner to be described.

The felloe or fixed rim of the wheel is formed as a continuous band or ring, designated generally by the numeral 4 being substantially cylindrical over its major portion and provided with inwardly turned flanges 5 which extend about the periphery of the wheel and serve to reinforce or strengthen the felloe.

At the required number of points about the wheel the steel rim or felloe 4 is formed with a plurality of substantially square depressions or recesses 6 which are approximately the shape of the spoke and are made by pressing the metal downwardly. The depression is thus formed integrally with the metal rim. Centrally located within the depression is a socket or depression 7, shaped to fit the rounded knob 3 in the spoke end.

The wheel is assembled by forming the metal rim or felloe band larger than its finished circumference; the spokes are then assembled with their mitered ends in contact about the hub and with the knobs 3 seated in the sockets 7. A contracting force is then exerted upon the steel rim to contract it on the spoke ends, this being usually done in a well known press or tire setter. The contraction of the rim serves to drive the mitered ends of the spokes together to form the hub, and to seat the projections 3 in the sockets 7. A strong substantial wheel is thus formed having a considerably cylindrical outer surface broken at a few points by the depressions 6, and reinforced by the down turned flanges 5.

Any suitable tire or tire carrying rim may be seated on the outer circumference of the wheel. I have here shown a metal base 8 to which is secured by vulcanization any suitable form of solid tire 9. This may be mounted in place by the operation known in the art as "pressing on" by which is meant that the tire carrying rim, slightly smaller than the wheel is forced laterally on to the wheel, where it stays in place by the compression which was exerted when the rim was applied. This operation also serves to tighten up the wheel structure.

In the form of the invention shown in Fig. 5, the wheel is constructed so as to accommodate a larger tire carrying rim.

In this modification the metal rim is formed with a laterally extending flange 10 which outrides or overhangs the body of the wheel as shown thereby affording a seat for a wider tire carrying rim 11.

It will be seen that there has been here provided a light, strong wheel for the reception of a tire carrying rim for use on heavy vehicles, and while it is shown as carrying a solid tire rim which is secured by the operation of pressing the rim on the wheel, it is not necessarily limited to this form of mounting. Other changes and modifications may be made within the scope of the invention and within the broad meaning of the claims attached hereto.

I claim:

1. In a wheel construction, a plurality of spokes radiating from the hub, an endless metal fixed rim about the spokes presenting a cylindrical outer surface, seats in the metal rim for the ends of the spokes, the said seats being located below the outer circumference of the fixed rim and a tire carrying rim in frictional engagement with the outer surface of the fixed rim.

2. In a wheel construction, a plurality of spokes radiating from the hub, an endless metal fixed rim about the spokes, inturned flanges about the fixed rim, said fixed rim having a plurality of depressions therein, and sockets formed in said depressions for the reception of the ends of the spokes.

3. In a wheel construction, a plurality of spokes radiating from the hub, an endless metal fixed rim about the spokes, inturned flanges at the edges of the fixed rim, said fixed rim having a plurality of depressions, sockets formed in said depressions for the reception of the ends of the spokes and a tire carrying rim surrounding the fixed rim.

4. In a wheel construction, a plurality of spokes radiating from the hub, an endless metal fixed rim about the spokes, said rim presenting a substantially continuous cylindrical surface, inturned flanges at the edges of the fixed rim, said fixed rim having a plurality of depressions, sockets formed in said depressions for the reception of the ends of the spokes and a resilient tire carrying rim surrounding and held in frictional engagement with the outer surface of the fixed rim.

JOSEPH G. SWAIN.